United States Patent
Tillotson

(10) Patent No.: US 11,005,301 B1
(45) Date of Patent: May 11, 2021

(54) SYSTEM AND METHOD FOR ENCRYPTED RESONANT INDUCTIVE POWER TRANSFER

(71) Applicant: The Boeing Company, Chicago, IL (US)

(72) Inventor: Brian J. Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/739,160

(22) Filed: Jan. 10, 2020

(51) Int. Cl.
| | |
|---|---|
| *H02J 50/12* | (2016.01) |
| *H02M 1/08* | (2006.01) |
| *H03B 5/32* | (2006.01) |
| *H02J 50/80* | (2016.01) |
| *H02J 7/02* | (2016.01) |
| *H02J 50/50* | (2016.01) |
| *H04W 12/037* | (2021.01) |

(52) U.S. Cl.
CPC ............... *H02J 50/12* (2016.02); *H02J 7/02* (2013.01); *H02J 50/50* (2016.02); *H02J 50/80* (2016.02); *H04W 12/037* (2021.01)

(58) Field of Classification Search
CPC combination set(s) only.
See application file for complete search history.

(56) References Cited

U.S. PATENT DOCUMENTS

| | | |
|---|---|---|
| 2,653,777 A | 9/1953 | Barkey |
| 4,678,141 A | 7/1987 | Sarrantonio |
| 5,781,222 A * | 7/1998 | Yamawaki ............ G11B 7/126 347/236 |
| 6,786,455 B1 | 9/2004 | Bartov |
| 7,900,866 B2 | 3/2011 | Kutzmann et al. |
| 8,118,261 B1 | 2/2012 | Schroeder |
| 8,191,828 B2 | 6/2012 | Lutke et al. |
| 8,398,028 B1 | 3/2013 | Speer et al. |
| 8,459,593 B2 | 6/2013 | Richardson |
| 9,238,414 B2 | 1/2016 | Ryberg et al. |
| 9,278,761 B2 | 3/2016 | Black et al. |
| 9,412,279 B2 | 8/2016 | Kantor et al. |
| 9,551,989 B2 | 1/2017 | Scarlatti et al. |
| 9,643,507 B2 | 5/2017 | Scarlatti et al. |
| 9,806,658 B2 | 10/2017 | Zeng et al. |
| 10,128,789 B2 | 11/2018 | Tillotson et al. |

(Continued)

*Primary Examiner* — An T Luu
(74) *Attorney, Agent, or Firm* — Ostrager Chong Flaherty & Broitman P.C.

(57) ABSTRACT

Systems and methods for ensuring that resonant inductive power transfer goes only to authorized users using encryption. Resonant inductive power transfer requires near-identical resonant frequencies in the transmitter and the receiver. The frequency of the power transfer signal changes on a schedule known only to the transmitter and receiver so a "power eavesdropper" cannot track the frequency well enough to efficiently receive power. To make the frequency transitions energetically efficient, a capacitive or inductive element is switched in or out of each circuit at moments of zero-crossing: zero charge on a capacitor or zero current in an inductor. To maintain phase alignment, either switching an inductor on the transmit side is nearly simultaneous with switching a capacitor on the receive side, or switching a capacitor on the transmit side is nearly simultaneous with switching an inductor on the receive side.

20 Claims, 13 Drawing Sheets

(56) References Cited

U.S. PATENT DOCUMENTS

| | | | |
|---|---|---|---|
| 10,396,653 B2* | 8/2019 | Iijima | H02M 3/158 |
| 2007/0096703 A1* | 5/2007 | Jain | H02M 3/158 |
| | | | 323/282 |
| 2008/0054124 A1 | 3/2008 | Takacs et al. | |
| 2011/0285369 A1* | 11/2011 | Cuk | H02M 3/158 |
| | | | 323/282 |
| 2016/0325834 A1 | 11/2016 | Foster | |

* cited by examiner

SYSTEM AND METHOD FOR ENCRYPTED RESONANT INDUCTIVE POWER TRANSFER

BACKGROUND

This disclosure generally relates to systems and methods for wireless power transmission. In particular, this disclosure relates to wireless power transmission by means of resonant inductively coupled transmitters and receivers.

Resonant inductive coupling is the near-field wireless transmission of electrical energy between two coils that are tuned to resonate at the same frequency. Resonant transfer works by making a primary coil ring with an oscillating current, which generates an oscillating magnetic field. A secondary coil in proximity to the primary coil can pick up energy from the oscillating magnetic field. If the primary and secondary coils are resonant at a common frequency, significant power can be transmitted from the primary coil to the secondary coil over a range of a few times the coil diameters at reasonable efficiency.

The general problem is to wirelessly transmit power from a transmitter to a receiver. A common approach for short-range transmission is resonant inductive power transfer. In this method, the transmitter and receiver both have resonant circuits tuned to the same frequency. For example, resonant inductive power transfer may be used for wireless recharging of batteries onboard aircraft such as unmanned aerial vehicles. Resonant inductive power transfer is also used for consumer electronics and for recharging electric automobiles.

Ideally, all power sent from the transmitter follows a low-loss path to authorized receivers. This does not happen if unauthorized receivers detect the resonant frequency and tune their receiver to the same frequency. In that case, the unauthorized receivers steal power. This adds cost on the transmit side and reduces the power available to authorized receivers. One solution is to impose physical security so that unauthorized receivers cannot get close enough to the transmitter to receive power. The drawback is this adds inconvenience, delay, and cost to authorized receivers.

An improved system and method for preventing unauthorized receivers from receiving power while enabling efficient transmission to authorized receivers would be beneficial.

SUMMARY

The subject matter disclosed in some detail below is directed to systems and methods for ensuring that resonant inductive power transfer goes only to authorized users using encryption. Resonant inductive power transfer requires near-identical resonant frequencies in the transmitter and the receiver. In accordance with the embodiments disclosed below, the frequency of the power transfer signal changes on a schedule known only to the transmitter and receiver so a "power eavesdropper" cannot track the frequency well enough to efficiently receive power. To make the frequency transitions energetically efficient, a capacitive or inductive element is switched in or out of each circuit at moments of zero-crossing: zero charge on a capacitor or zero current in an inductor. To maintain phase alignment, either switching an inductor on the transmit side is nearly simultaneous with switching a capacitor on the receive side, or switching a capacitor on the transmit side is nearly simultaneous with switching an inductor on the receive side.

Although various embodiments of systems and methods for encrypted resonant inductive power transfer are described in some detail later herein, one or more of those embodiments may be characterized by one or more of the following aspects.

One aspect of the subject matter disclosed in detail below is a method for transferring power from a resonant inductive power transmitter to a resonant inductive power receiver, the method comprising: (a) placing the resonant inductive power receiver within an electromagnetic coupling range of the resonant inductive power transmitter; (b) using the resonant inductive power transmitter to generate a first oscillating electromagnetic field having a first frequency during a first time interval; (c) producing a first oscillating electromotive force in the resonant inductive power receiver having the first frequency during the first time interval by resonant electromagnetic induction; (d) using the resonant inductive power transmitter to generate a second oscillating electromagnetic field having a second frequency different than the first frequency during a second time interval subsequent to the first time interval; and (e) producing a second oscillating electromotive force in the resonant inductive power receiver having the second frequency during the second time interval by resonant electromagnetic induction.

In accordance with some embodiments of the method described in the immediately preceding paragraph, the method further comprises: (f) configuring the resonant inductive power transmitter to generate the first oscillating electromagnetic field by opening a first switch in the resonant inductive power transmitter prior to step (b); (g) configuring the resonant inductive power receiver to produce the first oscillating electromotive force by closing a second switch in the resonant inductive power receiver prior to step (c); (h) configuring the resonant inductive power transmitter to generate the second oscillating electromagnetic field by closing the first switch prior to step (d); and (i) configuring the resonant inductive power receiver to produce the second oscillating electromotive force by opening the second switch prior to step (e). The states of the first and second switches and the first and second time intervals are dictated by a frequency-change switching sequence. The method further comprises sending information in encrypted form from the resonant inductive power transmitter to the resonant inductive power receiver, which information includes the frequency-change switching sequence.

Another aspect of the subject matter disclosed herein is a resonant inductive power transfer system comprising a resonant inductive power transmitter and a resonant inductive power receiver which have synchronous switching states for enabling resonant inductive power transfer in accordance with a frequency-change switching sequence. The resonant inductive power transmitter comprises: a voltage source; a first inductor and a first capacitor which are connected to form a first resonant circuit that is supplied with a voltage by the voltage source; a first switch and a second inductor which are connected in parallel with the first inductor when the first switch is closed; and a transmit switch controller configured to control a state of the first switch in accordance with a frequency-change switching sequence. The resonant inductive power receiver comprises: a third inductor and a second capacitor which are connected to form a second resonant circuit; a second switch and a second capacitor which are connected in parallel with the first capacitor when the second switch is closed; and a receive switch controller configured to control a state of the second switch in accordance with the frequency-change switching sequence. Respective resonant frequencies of the first and second resonant circuits equal a first resonant frequency when the first switch is closed and the second switch is open and equal a second resonant frequency different than the first resonant frequency when the first switch is open and the second switch is closed.

A further aspect of the subject matter disclosed herein is a resonant inductive power transfer system wherein the resonant inductive power transmitter comprises: a voltage source; a first inductor and a first capacitor which are connected to form a first resonant circuit that is supplied with a voltage by the voltage source; a first switch and a second capacitor which are connected in parallel with the first capacitor when the first switch is closed; and a transmit switch controller configured to control a state of the first switch in accordance with a frequency-change switching sequence. Conversely, the resonant inductive power receiver comprises: a second inductor and a third capacitor which are connected to form a second resonant circuit; a second switch and a third inductor which are connected in parallel with the second inductor when the second switch is closed; and a receive switch controller configured to control a state of the second switch in accordance with the frequency-change switching sequence.

Other aspects of systems and methods for encrypted resonant inductive power transfer are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for encrypted resonant inductive power transfer will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Resonant inductive coupling is the near-field wireless transmission of electrical energy between two coils that are tuned to resonate at the same frequency. Resonant transfer works by making a primary coil (referred to above and below as the "transmit coil") ring with an oscillating current, which generates an oscillating magnetic field. A secondary coil (referred to above and below as the "receive coil") in proximity to the primary coil can pick up energy from the oscillating magnetic field. If the primary and secondary coils are resonant at a common frequency, significant power can be transmitted at reasonable efficiency from the primary coil to the secondary coil over a range of about one quarter wavelength, where wavelength is the speed of light divided by the frequency of the oscillating current. Resonant inductive coupling requires both a resonant frequency match and an orientation match between the transmitter and receiver (i.e., the transmitting and receiving resonant circuits) for significant power transmission to occur. Specifically, the transmit coil and the receive coil are preferably oriented so that the magnetic dipole field passing through the receive coil from the transmit coil is oriented within about 45 degrees of parallel to the receive coil.

Figure 1:
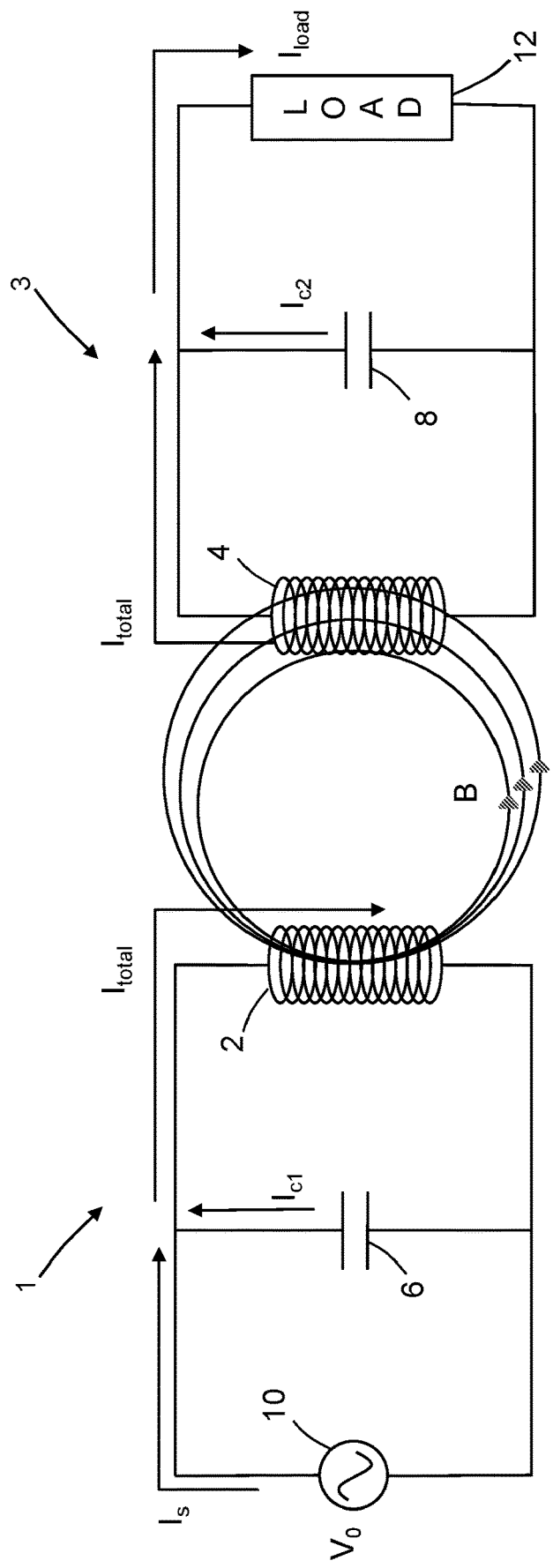
FIG. 1 is a circuit diagram representing some components of a transmitter and a receiver in a resonant system.

FIG. 1 is a circuit diagram representing a transmitter 1 and a resonant inductive power receiver 3 that form a resonant system when separated by a distance within a resonant inductive coupling range. The transmitter 1 comprises a resonant circuit connected to an AC source 10 (hereinafter "AC source 10"). (As used herein, "connected" means electrically connected.) The AC source 10 outputs an alternating current having a voltage $V_0$. The resonant circuit in the transmitter 1 comprises a transmit coil 2 and a capacitor 6 that tunes the transmit coil 2 to produce a magnetic field B (indicated by the circles in FIG. 1) that oscillates at the resonant frequency. The transmit coil 2 receives a current $I_{total}$ which is the sum of the current $I_s$ from the AC source 10 and the current $I_{c1}$ from the capacitor 6 (i.e., $I_s + I_{c1} = I_{total}$). The resonant inductive power receiver 3 comprises a resonant circuit connected to a load 12 (e.g., a battery charger). The resonant circuit in the resonant inductive power receiver 3 comprises a receive coil 4 and a capacitor 8 that tunes the receive coil 4 to the resonant frequency. During resonant inductive coupling, the load 12 receives a current $I_{load}$ which is the sum of the current $I_{total}$ induced in the receive coil 4 and the current $I_{c2}$ from the capacitor 6 (i.e., $I_{total} + I_{c2} = I_{load}$).

Figure 2:
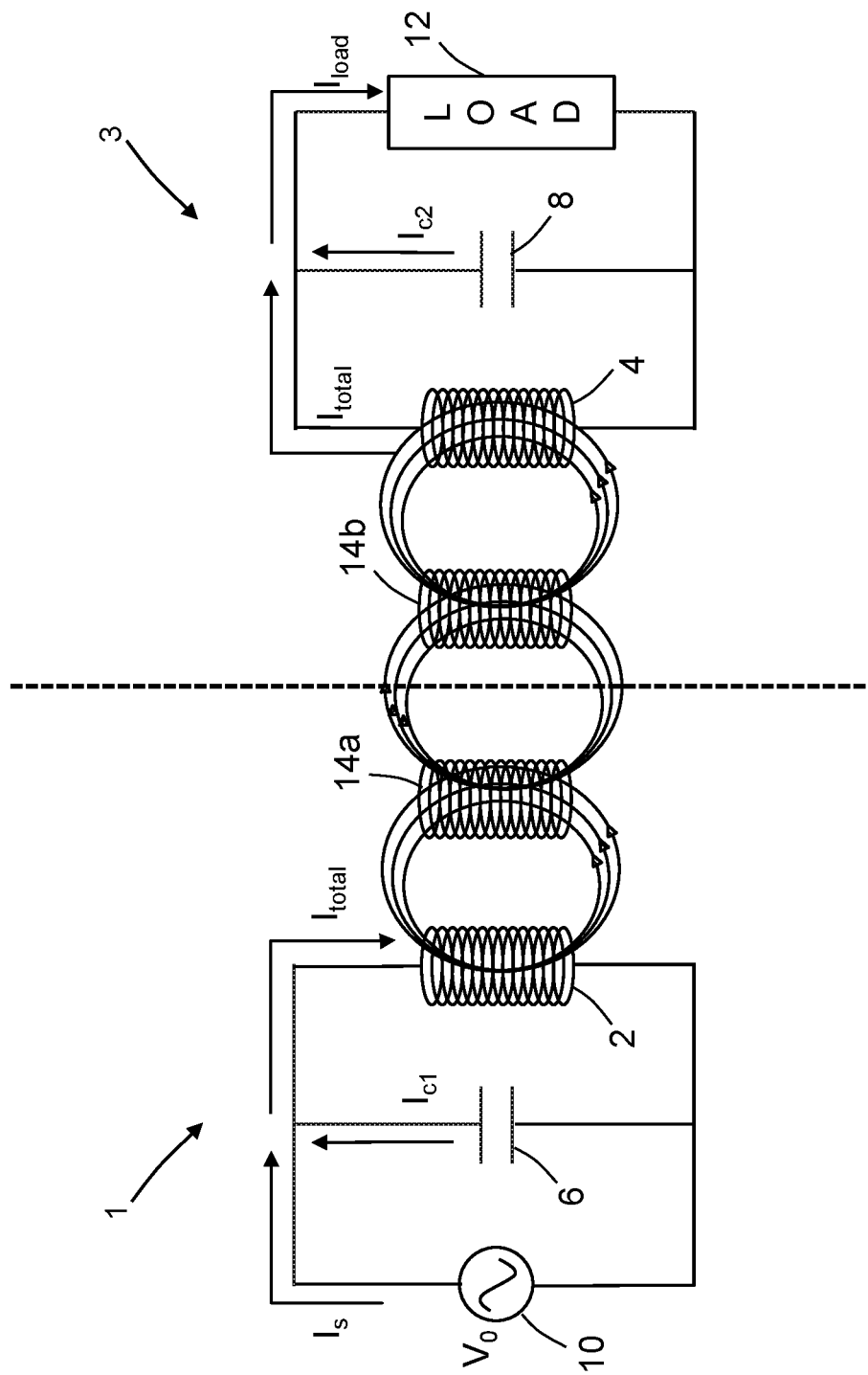
FIG. 2 is a circuit diagram representing some components of a transmitter and a receiver in a resonant system with relay coils.

In accordance with some of the embodiments disclosed herein, "relay" coils may be used with the receiving and transmit coils to amplify the amount of power transferred. FIG. 2 is a circuit diagram representing a transmitter 1 and a resonant inductive power receiver 3 in a resonant system with relay coils 14a and 14b. The relay coil 14a is resonantly inductively coupled to the transmit coil 2; the relay coil 14b is resonantly inductively coupled to the relay coil 14a; and the relay coil 14b is resonantly inductively coupled to the receive coil 4. Although not shown in FIG. 2), each of the relay coils 14a and 14b is connected to a respective capacitor (not shown) to form respective resonant circuits. The relay coil 14a is preferably disposed parallel and proximal to the transmit coil 2, while the relay coil 14b is preferably disposed parallel and proximal to the receive coil 4. (As used herein, the term "parallel" in the context of coils means that the axes of the coils are mutually parallel.)

The addition of relay coils contributes to greater buildup of current in the circuits. Specifically, the alternating current that is driven by voltage $V_0$ of the AC source 10 passes through the transmit coil 2 and feeds the capacitor 6. When the capacitor 6 discharges, its current $I_{c1}$ is added to the source current $I_s$. This process is repeated continuously, building up the total current $I_{total}$. The large current induces a similarly large current in the relay coil 14a, which is also connected to a capacitor (not shown in FIG. 2). The current passing through the relay coil 14a charges its associated capacitor. When this capacitor discharges, its current adds to the current being induced in the relay coil 14a. The current going through the relay coil 14a is now equal to the sum of $I_{total}$ plus the extra current from the capacitor to which the relay coil 14a is electrically coupled. This total current induces current in the capacitor that is connected to the relay coil 14b on the receiver side. Through a similar process as previously described, the current going through the relay coil 14b on the receiver side is magnified by additional capacitor current from the capacitor (not shown in FIG. 2) to which relay coil 16 is electrically coupled. Finally, this current induces current on the receive coil 4 which also is magnified over time by the capacitor 8. Through the process described, the current induced in receive coil 4 is much greater than when relay coils 14a and 14b are not used and thus total power transferred is also greater (P=IV).

Systems and methods for encrypted resonant inductive power transfer will now be described in some detail. In the embodiments disclosed below, the frequency changes on a schedule known only to the transmitter and receiver. To make the frequency transitions energetically efficient, a capacitive or inductive element is switched in or out of each circuit at moments of zero-crossing: zero charge on a capacitor or zero current in an inductor. To maintain phase alignment, either switching an inductor on the transmit side is nearly simultaneous with switching a capacitor on the receive side, or switching a capacitor on the transmit side is nearly simultaneous with switching an inductor on the receive side.

Figure 3:
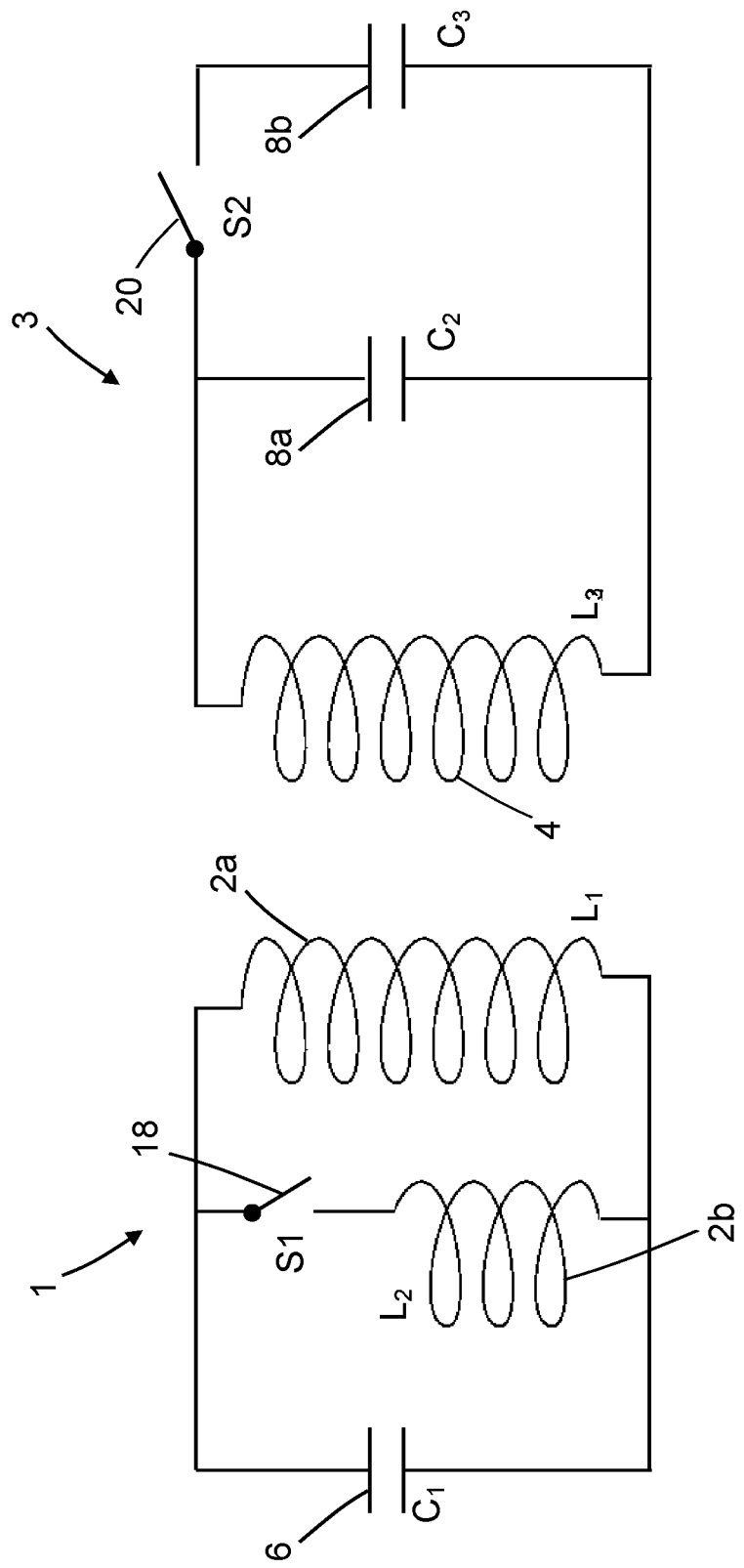
FIG. 3 is a circuit diagram representing some components of a transmitter (left-hand side) and a receiver (right-hand), including a transmit switch for switching an inductor and a receive switch for switching a capacitor to match resonant frequencies of the transmitter and receiver.

FIG. 3 is a circuit diagram representing some components of a transmitter (left-hand side) and a receiver (right-hand), including a transmit switch for switching an inductor and a receive switch for switching a capacitor to match resonant frequencies of the transmitter and receiver. The system includes a resonant inductive power transmitter 1 and a resonant inductive power receiver 3 which are configured to enable encrypted resonant inductive power transfer. In particular, resonant inductive power transmitter 1 and resonant inductive power receiver 3 include respective switches S1 and S2 for switching complementary elements to match resonant frequencies of the transmitter and receiver.

In accordance with the embodiment depicted in FIG. 3, the resonant inductive power transmitter 1 includes a transmit coil 2a having an inductance $L_1$ and a capacitor 6 having a capacitance $C_1$ which are connected to form a first resonant circuit. The resonant inductive power transmitter 1 further includes a coil 2b connected in parallel with the transmit coil 2a and a switch 18 (hereinafter "switch S1") to add or remove the coil 2b in parallel with the transmit coil 2a. The coil 2b has an inductance $L_2$ which may be equal to or different than inductance $L_1$. The resonant inductive power transmitter 1 also includes circuits, such as an amplifier (not shown in FIG. 3), configured to make an oscillator based on the resonant frequency of the first resonant circuit.

In accordance with the embodiment depicted in FIG. 3, the resonant inductive power receiver 3 includes a receive coil 4 having an inductance $L_3$ and a first capacitor 8a having a capacitance $C_2$ which are connected to form a second resonant circuit. The resonant inductive power receiver 3 further includes a second capacitor 8b connected in parallel with the first capacitor 8a and a switch 20 (hereinafter "switch S2") to add or remove the second capacitor 8b in parallel with the first capacitor 8a. The second capacitor 8b has a capacitance $C_3$ which may be equal to or different than capacitance $C_2$. The resonant inductive power receiver 3 also includes circuits, such as a rectifier (not shown in FIG. 3), configured to extract power from the resonant inductive power receiver 3 and deliver it to a useful load. The inductor values and capacitor values of the resonant inductive power receiver 3 are chosen so that: (a) when the switch S2 is closed, the resonant inductive power receiver 3 has the same first resonant frequency as the resonant inductive power transmitter 1 has when the switch S1 is open; and (b) when the switch S2 is open, the resonant inductive power receiver 3 has the same second resonant frequency (different than the first resonant frequency) as the resonant inductive power transmitter 1 has when the switch S1 is closed. The resonant inductive power transmitter 1 and the resonant inductive power receiver 3 each have a respective switch controller (not shown in FIG. 3) which control the states of the switch S1 and the switch S2 respectively. Each switch controller is a processor configured (e.g., programmed) to execute a common switch control program in the form of a digital copy of an agreed-to frequency-change switching sequence stored in a non-transitory tangible computer-readable storage medium or to execute an algorithm from which the frequency-change switching sequence can be determined. The switch states (open or closed) determine the resonant frequency of the resonant inductive power transmitter 1 and resonant inductive power receiver 3. As long as the switching sequence is known only to transmit and receive switch controllers of the resonant inductive power transmitter 1 and resonant inductive power receiver 3, unauthorized receivers cannot steal power from the system because unauthorized receivers cannot efficiently follow the changing (switched) resonant frequencies.

FIG. 3 shows one embodiment of an encrypted resonant inductive power transfer system in a simplified form. The oscillator circuitry (shown later in FIG. 9) and the switch controllers are not shown in FIG. 3. Only the inductive and capacitive elements that determine the resonant frequency of the transmitter and receiver are shown. Closing the switch S1 reduces total inductance of the transmit circuit, which raises the resonant frequency. Opening the switch S2 reduces total capacitance of the receive circuit, which raises the resonant frequency. By properly choosing the inductance and capacitance values, the system designer may make the lower and upper resonant frequencies of the resonant inductive power transmitter 1 match (be equal to) the lower and upper resonant frequencies respectively of the resonant inductive power receiver 3.

As used herein, the term "inductor" includes but is not limited to coils. Resonant power transfer works by electromagnetic induction (a.k.a. magnetic induction) from a transmit coil to a receive coil. Electromagnetic induction is the production of an electromotive force (i.e., voltage) across an electrical conductor in a changing magnetic field dB/dt, where B is the magnitude of the magnetic field. The transmit coil must produce an external magnetic field; the receive coil must be susceptible to external magnetic fields. Some inductors, like a choke ring, produce no external field and do not respond to external fields. Those inductors are not suitable for use as inductances $L_1$ and $L_3$. Inductance $L_2$ may also be in the form of a coil and contribute to power transfer; however, it is within scope of the invention that inductance $L_2$ be an inductor with no external field (i.e., not a coil), especially when inductance $L_2$ is small compared to inductance $L_1$. The functionality of the circuitry depicted in FIG. 3 will now be described with reference to FIGS. 4-6.

Figure 4:
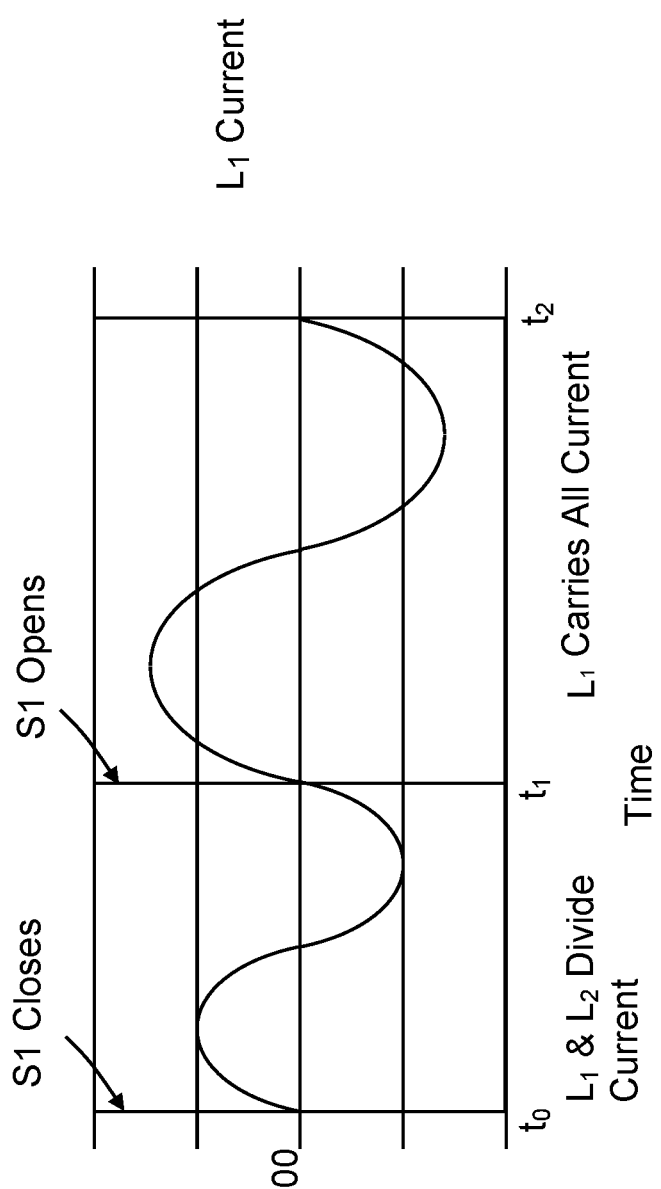
FIG. 4 is a graph showing the current through the transmit coil (seen in FIG. 3) over a time interval during which the state of the switch S1 of the transmitter changes from closed to open.

FIG. 4 is a graph showing the current through the transmit coil 2a (seen in FIG. 3) over a time interval during which the state of the switch S1 of the resonant inductive power transmitter 1 changes from closed to open. FIG. 4 shows what happens to the current through transmit coil 2a having inductance $L_1$ as switch S1 transitions from a closed state to an open state. At time $t_0$, the switch S1 is closed, so current is divided between transmit coil 2a having inductance $L_1$ and coil 2b having inductance $L_2$, which for simplicity are assumed herein (for the purpose of illustration only) to have equal inductance values. At time $t_0$, the current is zero; all the charge is stored as positive voltage in capacitor 6 (shown in FIG. 3). In the first half cycle (the full cycle being from time $t_0$ to time $t_1$), current flows from capacitor 6 (having capacitance $C_1$) through the transmit coil 2a and coil until capacitor 6 is fully charged negative. In the second half cycle, the current reverses. Throughout the interval from time $t_0$ to time $t_1$, the resonant inductive power transmitter 1 has twice as much current (again assuming that $L_1=L_2$) as shown in the plot of FIG. 4 because the two inductors divide the current. Assuming for simplicity that the inductance $L_2$ produces no external magnetic field, the resonant inductive power transmitter 1 produces an external magnetic field proportional to the current shown.

At time $t_1$, the switch S1 is opened. Current flowing from capacitor 6 (see FIG. 3) now goes only through the transmit coil 2a. Since energy E in an inductor is given by the equation $E=\frac{1}{2}LI^2$, where L is inductance and I is current. Since the energy in the transmit circuit at time $t_1$ is the same as the energy in the transmit circuit at time $t_0$ (assuming steady-state power transfer), the peak current through transmit coil 2a (see FIG. 3) is greater than in the first cycle by a factor of the square root of 2 ($\sqrt{2}$). Also, the circuit inductance is now twice as high. In addition, the angular frequency of an LC oscillator is given by the following equation:

$$\omega=(LC)^{-1/2}, \tag{1}$$

where L is the inductance and C is the capacitance, so the angular frequency of the oscillator decreases by a factor of $\sqrt{2}$.

Figure 5:
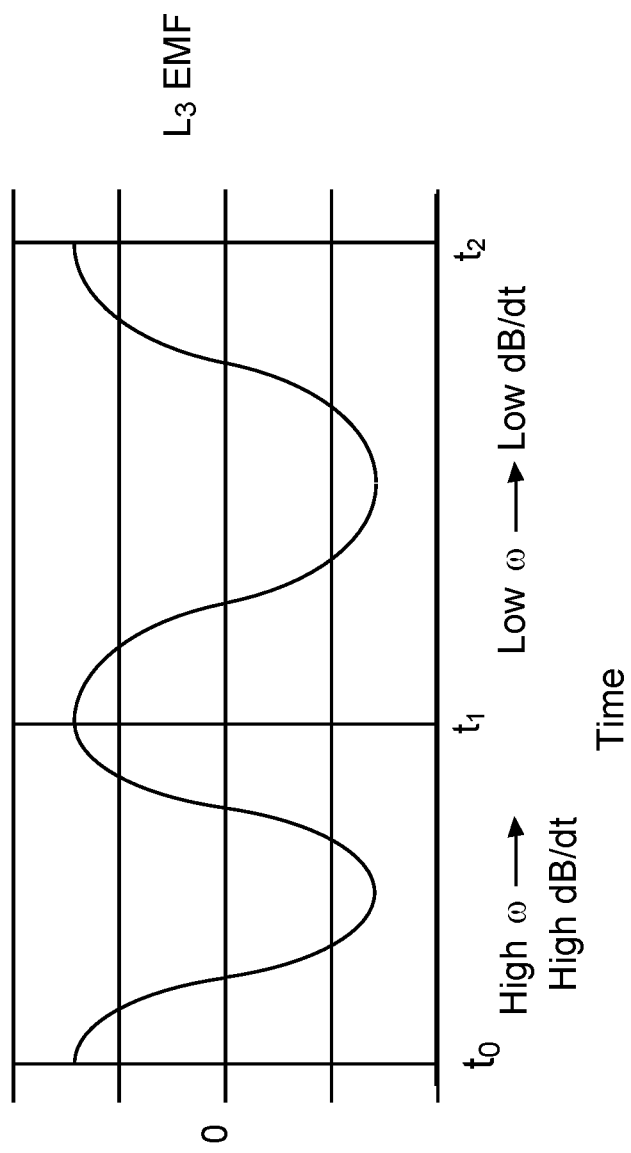
FIG. 5 is a graph showing the induced electromotive force (EMF) produced by the receive coil of the receiver over the time interval during which the state of the switch S1 changes from closed to open as depicted in FIG. 4.

FIG. 5 is a graph showing the induced electromotive force (EMF) produced by the receive coil 4 (see FIG. 3) of the resonant inductive power receiver 3 over the time interval from $t_0$ to $t_1$ FIG. 5 shows the effect of opening of switch S1 on the EMF induced in the receive coil 4. The magnitude of the induced EMF is a function of the rate of change of the magnetic flux $\Phi_B$ through the receive coil 4. The rate of change of $\Phi_B$ is proportional to both the magnitude of the magnetic field and to the angular frequency ω. The relevant magnetic flux is produced by current through the transmit coil 2a (again, assuming for simplicity that second inductor produces no external field). The rate of change is proportional to the derivative of the plot in FIG. 5, so the phase of the EMF leads the current in transmit coil 2a by 90°.

After time $t_1$, the frequency of the induced EMF drops by a factor of $\sqrt{2}$. Since the magnitude of the magnetic field cycle increases by the same factor as the frequency decreases, the magnitude of $d\Phi_B/dt$ and therefore of the EMF is unchanged. This is beneficial: the amount of power transferred from transmitter to receiver at any moment is proportional to the product of the EMF and the current in the receive coil 4. Because the EMF remains constant when switch S1 changes state, the power transfer rate remains constant. This minimizes electromagnetic interference and keeps cost low for the transmitter and receiver circuits.

Figure 6:
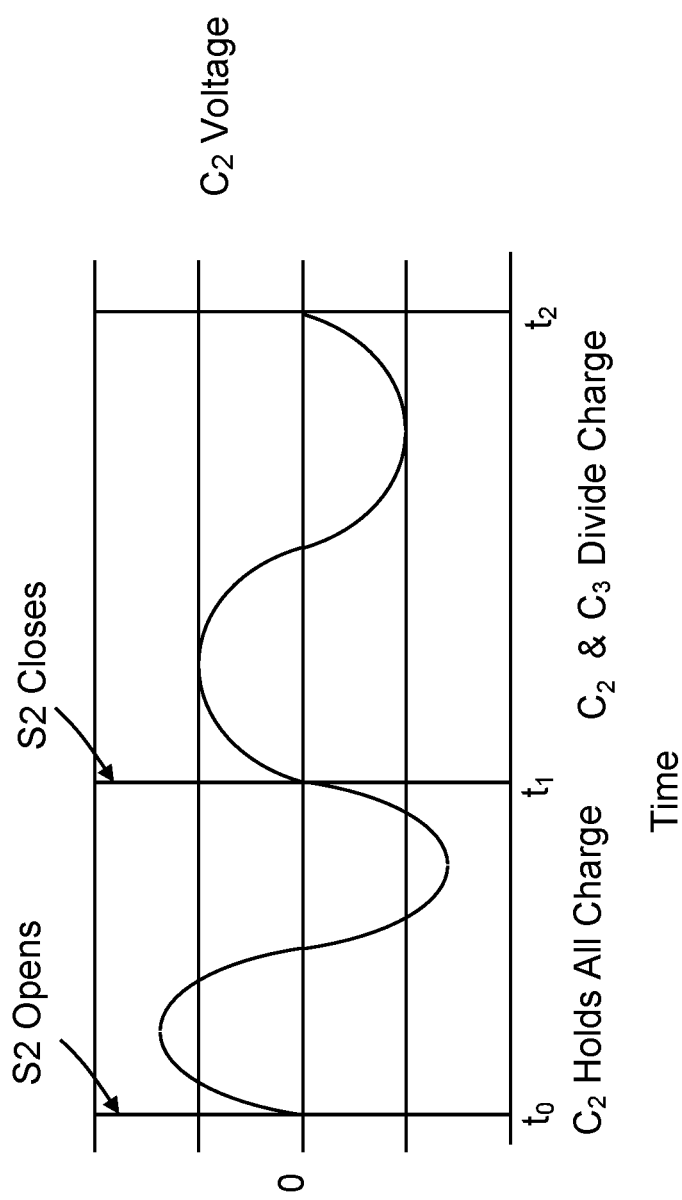
FIG. 6 is a graph showing the voltage across the capacitor $C_2$ in the receiver over the time interval during which the state of the switch S1 of the transmitter changes from closed to open as depicted in FIG. 4.

FIG. 6 is a graph showing the voltage across the capacitor 8a (see FIG. 3) in the resonant inductive power receiver 3 over the time interval during which the switch S1 is opened as depicted in FIG. 4. At time $t_0$, the capacitor 8a is empty. To avoid "stranding" energy in in capacitor 8b, the best time to open or close switch S2 is when the capacitors are uncharged, so switch S2 is opened at time $t_0$. All the current through receive coil 4 flows into capacitor 8a, so capacitor 8a charges rapidly. After one cycle, switch S2 is closed at time $t_1$, bringing capacitor 8b into the circuit and reducing the resonant frequency by a factor of $\sqrt{2}$ (assuming for simplicity that the capacitances $C_2$ and $C_3$ of capacitors 8a and 8b are equal). Since the energy E in a capacitor is given by the equation $E=\frac{1}{2}CV^2$, where C is capacitance and V is voltage, and since the energy in the receive circuit at time $t_1$ is the same as the energy at time $t_0$ (assuming steady-state power transfer), the peak voltage in capacitor 8a in the second cycle is lower than the peak voltage in the first cycle by a factor of $\sqrt{2}$.

By switching inductors in the transmitter and capacitors in the receiver, the resonant inductive power transfer system is able to provide simultaneous changes of resonant frequency in the transmitter and in the receiver, and does so without energy-wasting switching of inductors with non-zero current or of capacitors with non-zero voltage.

Figure 7:
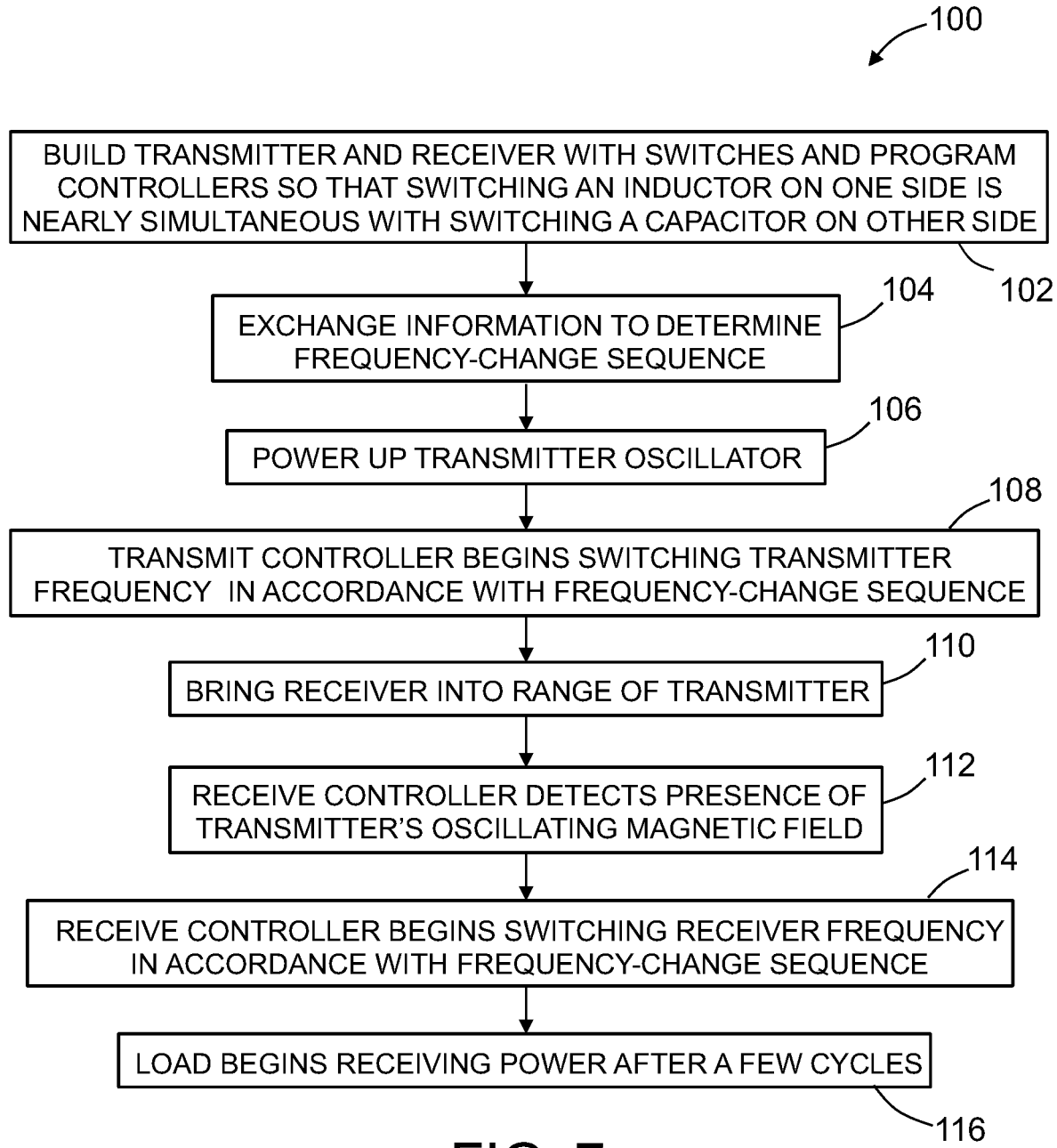
FIG. 7 is a flowchart identifying steps of a method 100 for encrypted resonant inductive power transfer.

FIG. 7 is a flowchart identifying steps of a method 100 for encrypted resonant inductive power transfer in accordance with one embodiment. The process includes the following steps: (a) build the transmitter and receiver with switches and program the respective switch controllers such that switching an inductor on the transmit side is nearly simultaneous with switching a capacitor on the receive side, or switching a capacitor on the transmit side is nearly simultaneous with switching an inductor on the receive side (step 102); (b) exchange information to determine the frequency-change sequence, e.g., a cryptographic key (step 104); (c) power up the transmitter oscillator (step 106); (d) the transmit switch controller begins switching the transmitter frequency in accordance with the frequency-change sequence (step 108); (e) bring the receiver into range of the transmitter (step 110); (f) the receive switch controller detects the presence of the transmitter's oscillating magnetic field (in some embodiments, the receive switch controller looks specifically for the agreed-upon frequencies, with switching between them at times agreeing with the frequency-change sequence) (step 112); (g) the receive switch controller begins switching the receiver frequency in accordance with the frequency-change sequence (step 114); and (h) assuming there is an electrical load attached to the receiver, that load begins receiving power after a few cycles (step 116).

Figure 8:
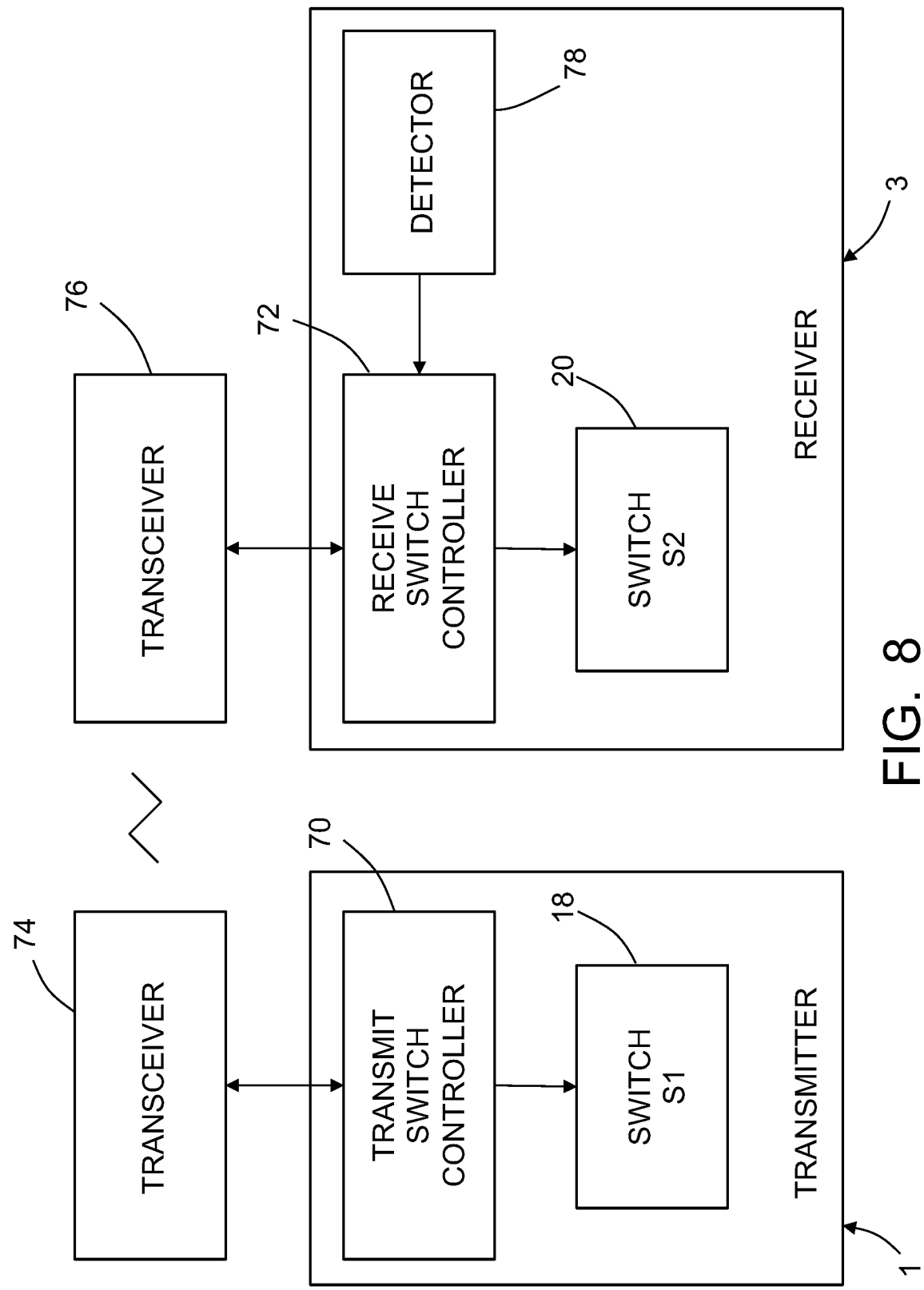
FIG. 8 is a block diagram identifying some components of an encrypted resonant inductive power transfer system in accordance with one embodiment.

FIG. 8 is a block diagram identifying some components of an encrypted resonant inductive power transfer system in accordance with one embodiment. The system includes a resonant inductive power transmitter 1 and a resonant inductive power receiver 3. The resonant inductive power transmitter 1 includes a switch S1 and a transmit switch controller 70 configured to control the state of switch S1. The resonant inductive power receiver 3 includes a switch S2 and a receive switch controller 72 configured to control the state of switch S2.

The time intervals for commanding the switches to change state are determined by a secure method such as public key encryption or one-time pad encryption. The transmit switch controller 70 is further configured to send a cryptographic key to a transceiver 74, while the receive switch controller 72 is further configured to receive the cryptographic key from a transceiver 76 following successful transmission and reception of the cryptographic key by the transceivers 74 and 76 respectively. The resonant inductive power receiver 3 further includes a detector 78 which detects the presence of the transmitter's oscillating magnetic field. The receive switch controller 72 is further configured to receive a signal from the detector 78 indicating the presence of the transmitter's oscillating magnetic field, in response to which the receive switch controller 72 begins switching the receiver frequency in accordance with the frequency-change sequence.

The systems and methods for encrypted resonant inductive power transfer disclosed herein provide at least the following benefits. First, compared to transmitting openly, encrypted resonant inductive power transfer provides reliable protection against energy loss, which improves the economic effectiveness of resonant energy transfer. (The level of protection depends on the type of encryption chosen, just as for digital information.) Second, compared to physical security, such as human guards or cipher-locked doors, the systems and methods disclosed herein are far easier and cheaper to use, thereby improving economics of resonant power transfer.

It is well known that a resonant circuit oscillates at an angular frequency given by Eq. (1). In the description provided above, simple resonant circuits have been shown for clarity of explanation. In actual use, a resonant circuit must be incorporated in a harmonic oscillator on the transmit side. On the receive side, a resonant circuit must be coupled to a load, such as a rectifier, battery charger or other load.

Figure 9:
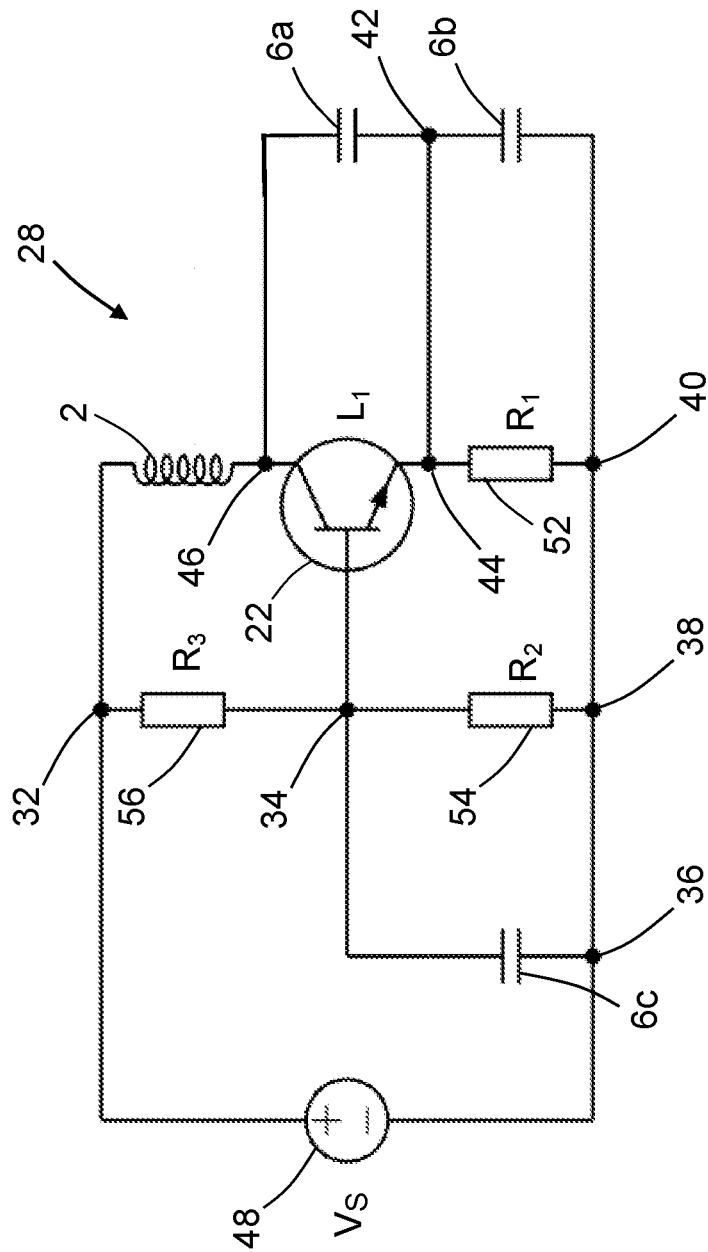
FIG. 9 is a circuit diagram representing some components of a common-base Colpitts oscillator consisting of an NPN-type bipolar junction transistor with its output connected to its input in a feedback loop containing a parallel resonant circuit (tuned circuit), which functions as a bandpass filter to set the frequency of oscillation.

FIG. 9 is a circuit diagram representing some components of a common-base Colpitts oscillator 28 (hereinafter "oscillator 28") that uses a combination of inductors and capacitors to produce an oscillation at a certain frequency. The distinguishing feature of the Colpitts oscillator is that the feedback for the active device is taken from a voltage divider made of two capacitors in series across the inductor. The oscillator 28 includes an NPN-type bipolar junction transistor 22 (hereinafter "bipolar junction transistor 22") with its output connected to its input in a feedback loop containing a parallel resonant circuit (tuned circuit), which resonant circuit functions as a bandpass filter to set the frequency of oscillation. Instead of a bipolar junction transistor, another active component such as a field-effect transistor, capable of producing gain at the desired frequency, may be used.

An NPN transistor comprises two semiconductor junctions that share a thin p-doped region. The regions of a bipolar junction transistor are called emitter, base, and collector. As seen in FIG. 9, the base of bipolar junction transistor 22 is connected to a junction 34, the emitter of bipolar junction transistor 22 is connected to a junction 42, and the collector of bipolar junction transistor 22 is connected to a junction 46.

The oscillator 28 further includes a resistor 52 having a resistance $R_1$, a resistor 54 having a resistance $R_2$, and a resistor 56 having a resistance $R_3$. One terminus of resistor 52 is connected to the junction 44 and the other terminus of resistor 52 is connected to a junction 40. One terminus of resistor 54 is connected to the junction 34 and the other terminus of resistor 54 is connected to a junction 38 that is connected to junction 40. One terminus of resistor 56 is connected to the junction 34 and the other terminus of resistor 56 is connected to a junction 32.

The oscillator 28 further includes capacitors 6a and 6b which are connected in series via a junction 42 that is connected to junction 44. One side of capacitor 6b is connected to junction 42 while the other side of capacitor 6b is connected to junction 40. One side of capacitor 6a is connected to junction 42 while the other side of capacitor 6a is connected to junction 46. The oscillator 28 further includes a capacitor 6c having one side connected to junction 34 and the other side connected to a junction 36 that is connected to junction 38.

The oscillator 28 also includes a transmit coil 2 having an inductance $L_1$. One terminus of transmit coil 2a is connected to the junction 46 and the other terminus of transmit coil 2a is connected to the junction 32.

The oscillator 28 further includes a voltage source 48 that produces a voltage $V_s$. One terminus of voltage source 48 is connected to junction 32; the other terminus of voltage source 48 is connected to junction 36.

In accordance with one proposed implementation: (a) the capacitors 6a, 6b, and 6c have respective capacitances of 100 pF, 100 pF, and 100 nF; (b) the resistors 52, 54, and 56 have respective resistances $R_1=2.2$ k$\Omega$, $R_2=10$ k$\Omega$, and $R_3=10$ k$\Omega$; (c) the transmit coil 2 has an inductance $L_1=150$ nH; and (d) voltage source 48 produces a voltage $V_s=6$ V. Using these values, the oscillation frequency ω is given by Eq. (1), where L is shown as $L_1$ (150 nH) and C is the series capacitance of capacitors 6a and 6b (50 pF). (The connection from the junction 42 between capacitors 6a and 6b provides feedback to the amplifying bipolar junction transistor 22, but does not substantially affect the resonant frequency. Thus, capacitors 6a and 6b act in series, affecting the circuit as a single capacitor.) The angular frequency ω for this example is about 365 sec$^{-1}$ and the cyclic frequency is about 58 MHz.

Figure 10:
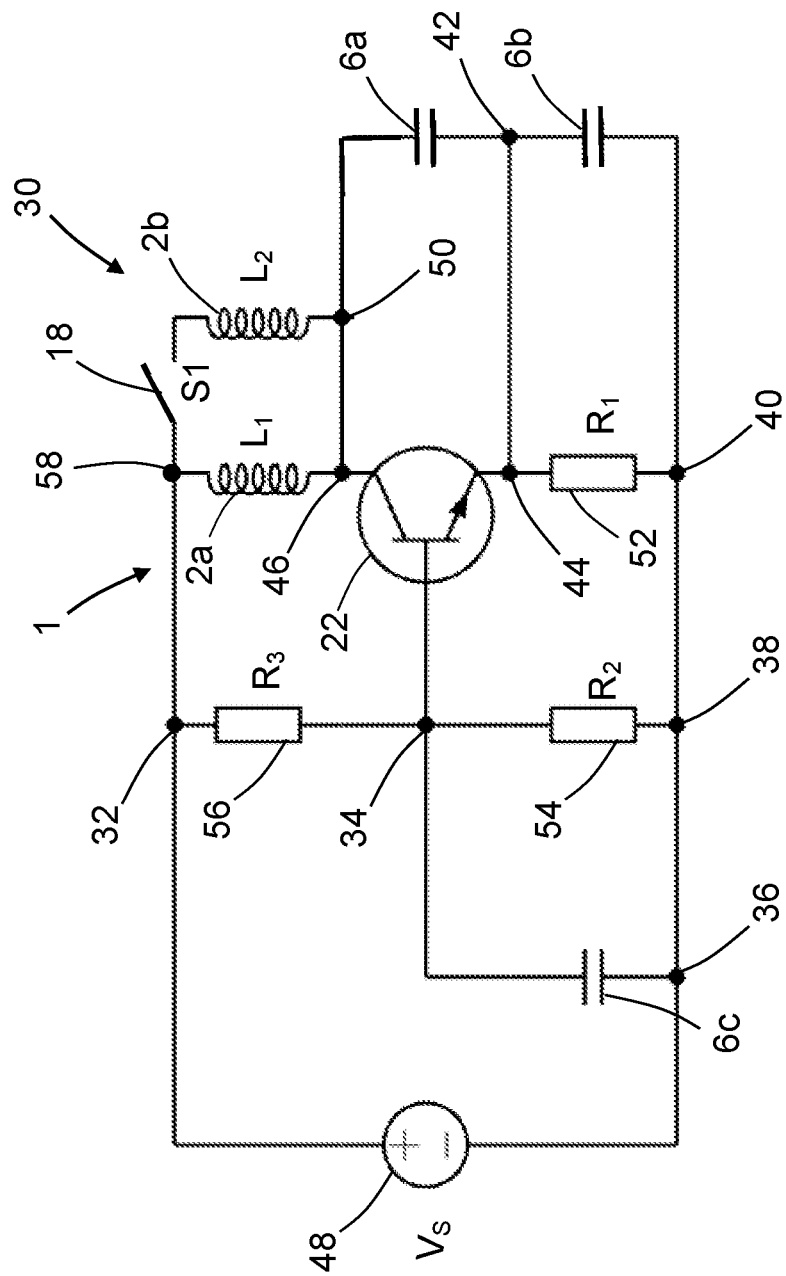
FIG. 10 is a circuit diagram representing some components of a common-base Colpitts oscillator which has been modified to include a second inductor having an inductance $L_2$ connected in parallel with a first inductor having an inductance $L_1$ and a switch S1 to add or remove the second inductor in parallel with the first inductor in accordance with one embodiment.

FIG. 10 is a circuit diagram representing some components of a modified common-base Colpitts oscillator 30 (hereinafter "oscillator 30") in accordance with one proposed implementation. In contrast to the oscillator 28 depicted in FIG. 9, the oscillator 30 has been modified to include a coil 2b having one terminus connected to a junction 50. The junction 50 is connected to junction 46 and one side of capacitor 6a. In addition, the oscillator 30 includes a switch S1 that switchably couples the other terminus of coil 2b to the junction 58. The coil 2b has an inductance $L_2$ and is connected in parallel with a transmit coil 2a having an inductance $L_1$. In the closed state, switch S1 adds the coil 2b in parallel with the transmit coil 2a; in the open state, switch S1 disconnects coil 2b from junction 58, thereby removing coil 2b from being parallel with transmit coil 2a. Assume that $L_1=L_2=150$ nH. When switch S1 is open, the resonant frequency is the same as in the oscillator 28 shown in FIG. 9, about 365 sec$^{-1}$. When switch S1 is closed, total inductance drops by half to 75 nH, and the resonant angular frequency rises by a factor of √2 to ω=516 sec$^{-1}$. (For simplicity, this disclosure treats the inductors as independent. In reality, both produce external fields reaching the receiver, so the inductors have some mutual inductance. Persons skilled in the art oscillator design know how to manage mutual inductance, choosing correct inductance values to give the desired frequency shift.)

Given the example depicted in FIG. 10, persons skilled in the art should be able to implement a transmitter suitable for enabling encrypted resonant inductive power transfer using any of several types of LC oscillator: Hartley, Clapp, etc. One innovative aspect is providing an inductor or a capacitor in parallel to an existing inductor or capacitor, connected via a switch, so that the oscillator frequency changes between two known values when the switch changes state.

Figure 11:
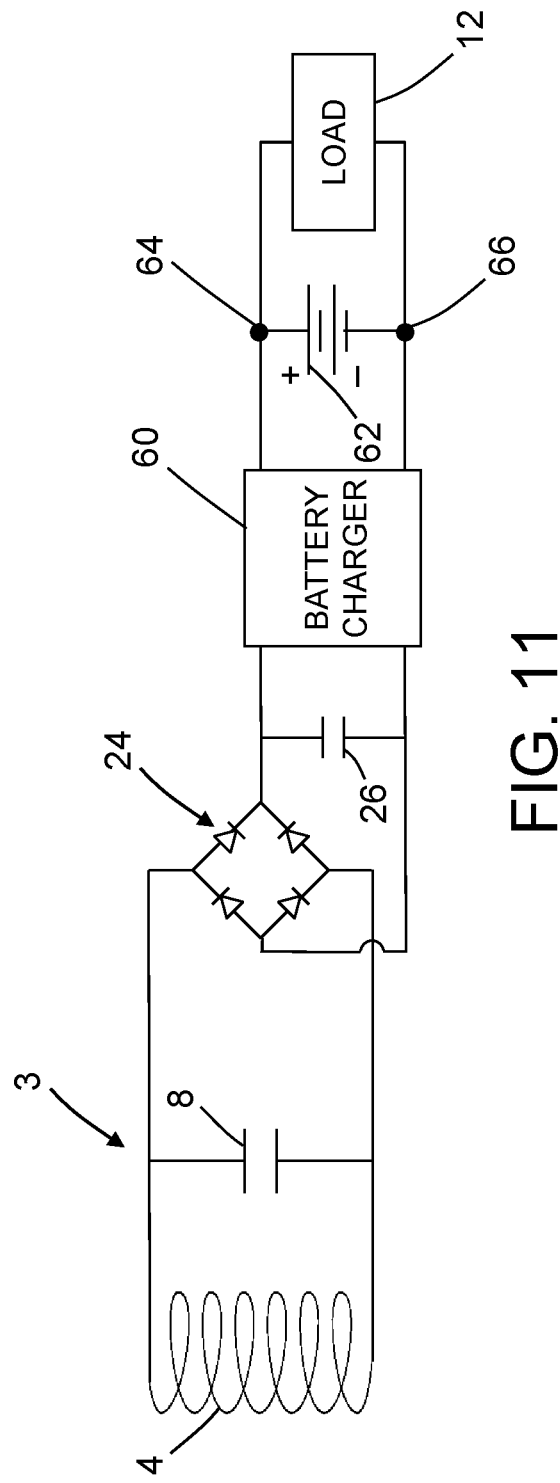
FIG. 11 is a circuit diagram identifying some components of a battery charging system that includes a resonant inductive power receiver and a rectifier for producing direct current for recharging a battery when an EMF is induced in the receive coil of resonant inductive power receiver.

FIG. 11 is a circuit diagram identifying some components of a battery charging system that includes a resonant inductive power receiver 3 and a rectifier 24 for producing direct current for recharging a battery 62 when an EMF is induced in the receive coil 4. This system was disclosed in U.S. Patent Publ. No. 2019/0237999 published on Aug. 1, 2019. This battery charging system may be mounted to a vehicle (such as an aircraft) for receiving power wirelessly from a resonant inductive power transmitter (not shown in FIG. 11). The battery charging system shown in FIG. 11 includes a receive coil 4 in which an alternating current is induced and a capacitor 8 that is connected to the receive coil 4 for tuning the receive coil 4 to a resonant frequency. The system further includes a rectifier 24 that is connected to the receive coil 4 and to the capacitor 8 for converting alternating current from the receive coil 4 and capacitor 8 into direct current. A smoothing capacitor 26 is connected to receive direct current from the rectifier 24. A battery charger 60 is connected to receive direct current from the rectifier 24. The battery 62 has a positive terminal 64 and a negative terminal 66 connected to the battery charger 60. The battery charger 60 is configured to charge the battery 62 using direct current produced from alternating current induced in the receive coil 4 and alternating current produced by the capacitor 8. More specifically, the battery charger 60 may comprise a voltage regulator to avoid over-charging the battery 62, a current limiter to ensure that charging does not occur too rapidly, and temperature sensors which indicate to the battery charger 60 when charging should cease because the battery 62 is overheating. As depicted in FIG. 11, once the battery 62 has been recharged, it can be used to provide direct current to a load 12.

Figure 12:
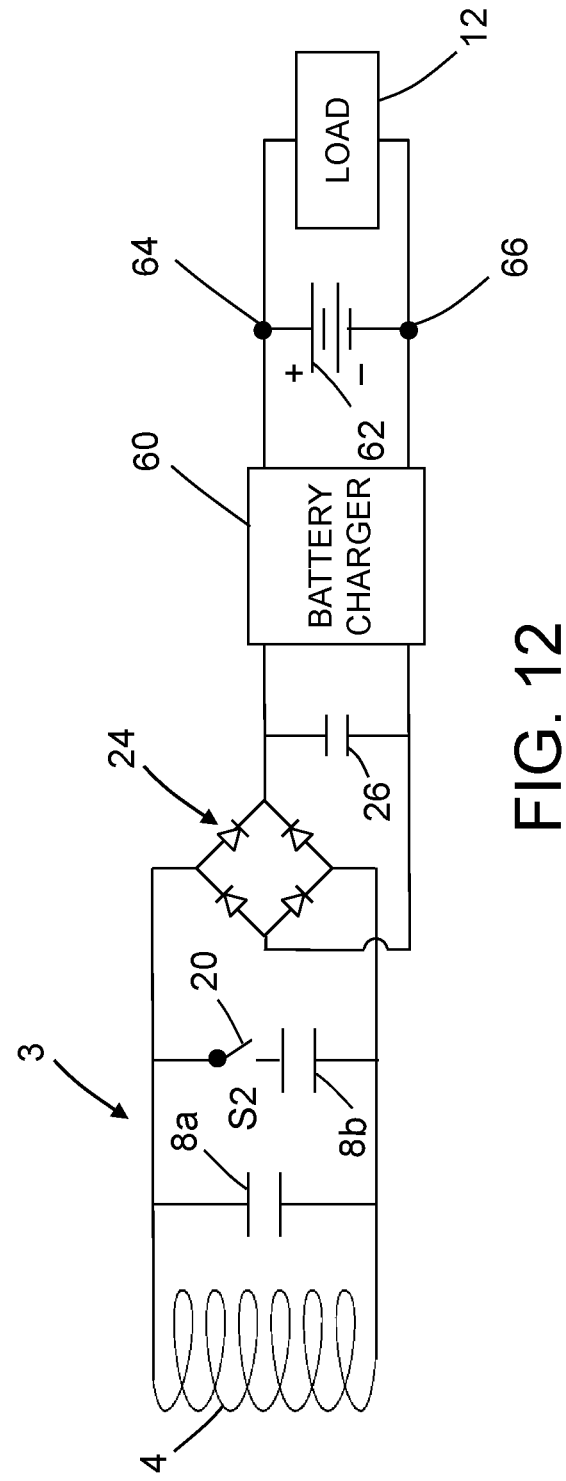
FIG. 12 is a circuit diagram identifying some components of a battery charging system which has been modified to include a second capacitor having a capacitance $C_3$ connected in parallel with a first capacitor having a capacitance $C_2$ and a switch $S_2$ to add or remove the second capacitor in parallel with the first capacitor in accordance with one embodiment.

FIG. 12 is a circuit diagram identifying some components of an encrypted battery charging system having a resonant inductive power receiver 3 which has been modified to include a second capacitor 8b having a capacitance $C_3$ connected in parallel with a first capacitor 8a having a capacitance $C_2$ (as seen in FIG. 3) and a switch S2 to add or remove the second capacitor 8b in parallel with the first capacitor 8a in accordance with one embodiment. More specifically, the second capacitor 8b is in parallel with the first capacitor 8a when switch S2 is closed. Assume that $C_2=C_3=100$ pF. When switch S1 is open, the resonant frequency is the same as in the resonant inductive power receiver 3 shown in FIG. 11. When the state of switch S2 changes from open to closed, total capacitance doubles and the resonant angular frequency drops by a factor of √2.

Combining a resonant inductive power transmitter 1 in the form of oscillator 30 depicted in FIG. 10 and the resonant inductive power receiver 3 depicted in FIG. 12 into a working system, whenever the transmit switch controller 70 (see FIG. 8) closes switch S1 to raise the resonant frequency of the resonant inductive power transmitter 1, the receive switch controller 72 opens switch S2 to raise the resonant frequency of the resonant inductive power receiver 3. Conversely, whenever the transmit switch controller 70 opens switch S1, the receive switch controller 72 closes switch S2.

Switch controllers on the transmitter and on the receiver coordinate the frequency transitions. In some embodiments, a mutually known string of ones and zeros signals high or low frequency, with transitions taking place at the end of each sinusoid cycle. In some embodiments, a mutually-known string of ones and zeros signals whether a change takes place or not at the end of each sinusoid signal. In some embodiments, the string of ones and zeros is generated by a mutually-known random number generator that is seeded with a time-based value, e.g., the GPS time signal expressed in IRIG-B format, which gives a new seed value each second.

Although FIG. 3 showed parallel inductors on the transmitter side and parallel capacitors on the receiver side, it is also possible to add parallel capacitors on the transmitter side and parallel inductors on the receiver side, choosing appropriate types of oscillator and receiver. For example, instead of the Colpitts oscillator used in FIG. 10, a Hartley oscillator can be used, substituting inductors for capacitors and vice versa. These alternate embodiments are in scope of the invention, providing two frequencies that the transmitter can switch between and that the receiver can switch between, where the same pair of frequencies are used.

Figure 13:
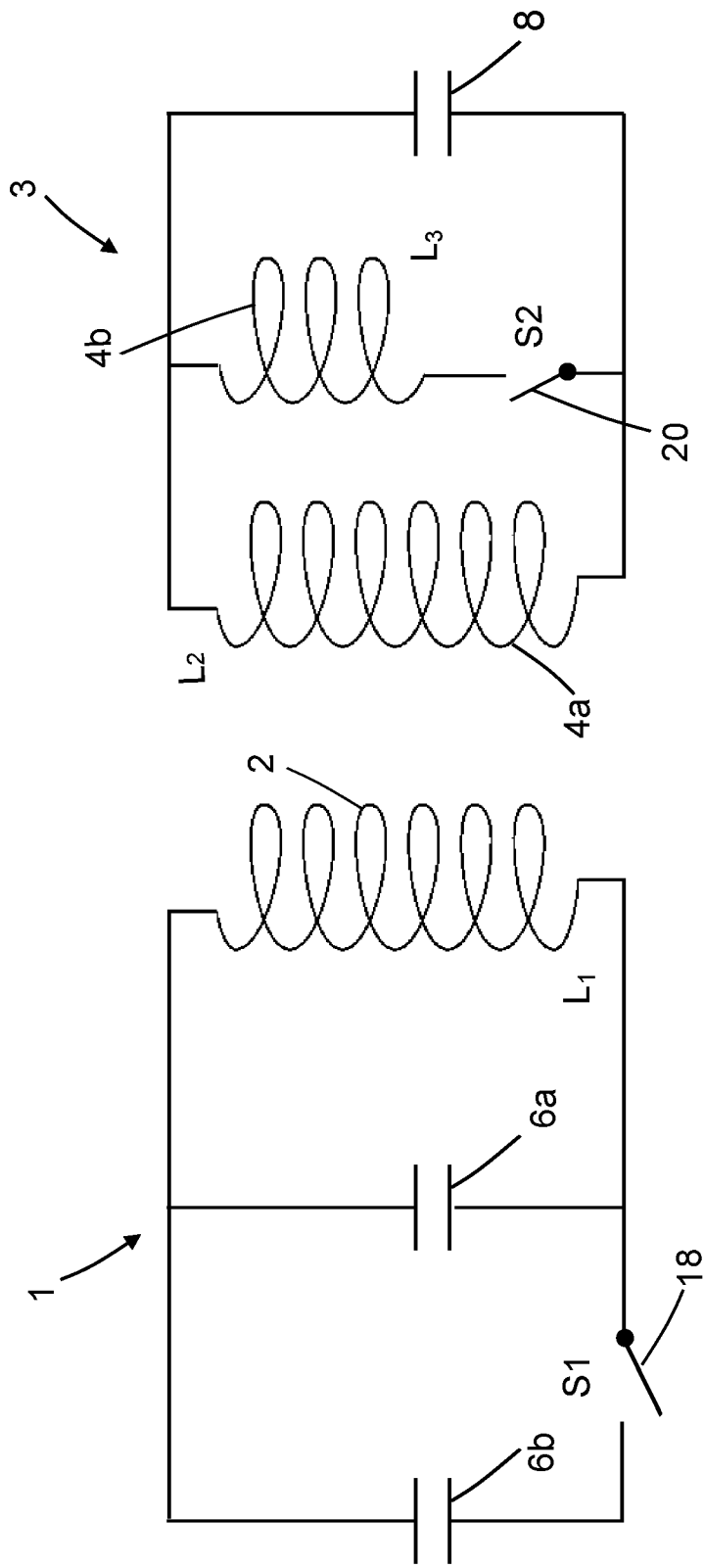
FIG. 13 is a circuit diagram representing some components of a transmitter (left-hand side) and a receiver (right-hand), including a transmit switch for switching a capacitor and a receive switch for switching an inductor to match resonant frequencies of the transmitter and receiver.

FIG. 13 is a circuit diagram representing some components of a transmitter (left-hand side) and a receiver (right-hand), including a transmit switch for switching a capacitor and a receive switch for switching an inductor to match resonant frequencies of the transmitter and receiver. The system includes a resonant inductive power transmitter 1 and a resonant inductive power receiver 3 which are configured to enable encrypted resonant inductive power transfer. In particular, resonant inductive power transmitter 1 and resonant inductive power receiver 3 include respective switches S1 and S2 for switching complementary elements to match resonant frequencies of the transmitter and receiver.

In accordance with the embodiment depicted in FIG. 13, the resonant inductive power transmitter 1 includes a transmit coil 2 having an inductance $L_1$ and a first capacitor 6a having a capacitance $C_1$ which are connected to form a first resonant circuit. The resonant inductive power transmitter 1 further includes a second capacitor 6b connected in parallel with the capacitor 6a and a switch 18 (hereinafter "switch S1") to add or remove the capacitor 6b in parallel with the capacitor 6a. The capacitor 6b has a capacitance $C_2$ which may be equal to or different than capacitance $C_1$. The resonant inductive power transmitter 1 also includes circuits, such as an amplifier (not shown in FIG. 13), configured to make an oscillator based on the resonant frequency of the first resonant circuit.

In accordance with the embodiment depicted in FIG. 13, the resonant inductive power receiver 3 includes a receive coil 4a having an inductance $L_2$ and a capacitor 8 having a capacitance $C_3$ which are connected to form a second resonant circuit. The resonant inductive power receiver 3 further includes a coil 4b connected in parallel with the receive coil 4a and a switch 20 (hereinafter "switch S2") to add or remove the coil 4b in parallel with the receive coil 4a. The coil 4b has an inductance $L_3$ which may be equal to or different than inductance $L_2$. The resonant inductive power receiver 3 also includes circuits, such as a rectifier (not shown in FIG. 13), configured to extract power from the resonant inductive power receiver 3 and deliver it to a useful load. The inductor values and capacitor values of the resonant inductive power receiver 3 are chosen so that: (a) when the switch S2 is closed, the resonant inductive power receiver 3 has the same first resonant frequency as the resonant inductive power transmitter 1 has when the switch S1 is open; and (b) when the switch S2 is open, the resonant inductive power receiver 3 has the same second resonant frequency (different than the first resonant frequency) as the resonant inductive power transmitter 1 has when the switch S1 is closed. The resonant inductive power transmitter 1 and the resonant inductive power receiver 3 each have a respective switch controller (not shown in FIG. 13) which control the states of switches S1 and S2 respectively, as previously described with reference to FIG. 3.

FIG. 13 shows one embodiment of an encrypted resonant inductive power transfer system in a simplified form. The oscillator circuitry and the switch controllers are not shown in FIG. 13. Only the inductive and capacitive elements that determine the resonant frequency of the transmitter and receiver are shown. Opening the switch S1 reduces total capacitance of the transmit circuit, which raises the resonant frequency. Closing the switch S2 reduces total inductance of the receive circuit, which raises the resonant frequency. By properly choosing the inductance and capacitance values, the system designer may make the lower and upper resonant frequencies of the resonant inductive power transmitter 1 match (be equal to) the lower and upper resonant frequencies respectively of the resonant inductive power receiver 3.

The encrypted resonant inductive power transfer system may be embodied many ways. In accordance with one embodiment, the transmitter has an inductor and two capacitors, while the receiver has a capacitor and two inductors (see FIG. 13). In accordance with another embodiment, the transmitter has a capacitor and two inductors, while the receiver has an inductor and two capacitors (see FIG. 3).

In accordance with other embodiments, the transmit and receive coils may be electromagnetically coupled via one or more relay coils (see FIG. 2). A relay coil includes an inductive coil and a capacitor tuned to resonate at the same frequency as the transmitter and the receiver. It has no direct electric connection to either; it is coupled to each by induction. Because it is electrically isolated, the relay coil may have a very high Q-value; therefore, its magnetic field can become very strong, which increases the power being transferred.)

Alternative embodiments have more than two resonant frequencies. For example, the transmitter may have an inductor and three differently-sized capacitors, which, when switched in various combinations, creates four resonant frequencies. The corresponding receiver would have a capacitor and three differently-sized inductors. The encryption then specifies a pattern of hopping among the four frequencies.

The resonant circuit of the resonant inductive power transmitter 1 may be configured as part of an oscillator, wherein the oscillator is selected from the group including Armstrong, Clapp, Colpitts, Hartley, Lampkin, Seiler, and Vackář oscillators. The resonant circuit of the resonant inductive power receiver 3 is connected to the input of a rectifier, which is in turn to the input of a battery charger (see FIG. 12).

The encrypted resonant inductive power transfer system disclosed herein uses a changing resonant frequency that changes in accordance with a pattern that is known to both the transmitter and the receiver, but is not easily deduced by anyone else. Compared to frequency-hopping radio technology, the technology disclosed herein: (a) transfers power rather than data; (b) works in the electromagnetic near field rather than the far field; and (c) requires synchronous switching of an inductor on one side (e.g., the transmitter) and a capacitor on the other side (e.g., the receiver). This is necessary because the transmitter and receiver are in each other's near field, so energy in the inductor on one side is tightly phase-aligned to energy in the capacitor on the other side. Frequency-hopping schemes in radio technology take place in the far field, so tight phase alignment of switching times is not needed (or even possible). In those schemes, frequency changes at the receiver and at the transmitter can be independently accomplished by whatever means is convenient: switching an inductor, switching a capacitor, or switching to a different crystal oscillator.

While systems and methods for encrypted resonant inductive power transfer have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "controller" should be construed broadly to encompass a system having at least one computer or processor, and which may have multiple computers or processors. As used in the preceding sentence, the terms "computer" and "processor" both refer to devices having a processing unit (e.g., a central processing unit) and some form of memory (i.e., computer-readable medium) for storing a program which is readable by the processing unit. For example, the term "controller" includes, but is not limited to, a small computer on an integrated circuit containing a processor core, memory and programmable input/output peripherals.

The invention claimed is:

1. A resonant inductive power transfer system comprising a resonant inductive power transmitter, wherein the resonant inductive power transmitter comprises:

a transistor connected to first, second, and third junctions (34, 46, 44);

a first resistor having one terminus connected to the third junction (44) and another terminus connected to a fourth junction (40);

a second resistor having one terminus connected to the first junction (34) and another terminus connected to a fifth junction (38) that is connected to the fourth junction (40);

a third resistor having one terminus connected to the first junction (34) and another terminus connected to a sixth junction (32);

a first inductor having one terminus connected to the second junction (46) and another terminus connected to a seventh junction (58);

a switch having one terminus connected to the seventh junction (58);

a transmit switch controller configured to control a state of the first switch in accordance with a frequency-change switching sequence;

a second inductor having one terminus connected to an eight junction (50) which is connected to the second junction (46) and another terminus connected to another terminus of the switch;

a first capacitor having one terminus connected to a ninth junction (42) that is connected to the third junction (44) and another terminus connected to the eighth junction (50);

a second capacitor having one terminus connected to the ninth junction (42) and another terminus connected to the fourth junction (40); and a voltage source having one terminus connected to the fifth junction (38) and another terminus connected to the sixth junction (32), wherein the first inductor and first capacitor are connected to form a first resonant circuit that is supplied with a voltage by the voltage source; and the switch and second inductor are connected in parallel with the first inductor when the switch is closed.

2. The system as recited in claim 1, wherein the first inductor is a transmit coil.

3. The system as recited in claim 2, wherein the second inductor is a coil.

4. The system as recited in claim 2, wherein the second inductor is a choke ring.

5. A resonant inductive power transfer system comprising a resonant inductive power transmitter, wherein the resonant inductive power transmitter comprises:

a voltage source;

a first inductor and a first capacitor which are connected to form a first resonant circuit that is supplied with a voltage by the voltage source;

a switch and a second inductor which are connected in parallel with the first inductor when the first switch is closed; and a transmit switch controller configured to control a state of the first switch in accordance with a frequency-change switching sequence, wherein the transmit switch controller commands the switch to change state when current in the second inductor crosses zero.

6. The system as recited in claim 5, wherein the first inductor is a transmit coil.

7. The system as recited in claim 6, wherein the second inductor is a coil.

8. The system as recited in claim 6, wherein the second inductor is a choke ring.

9. A resonant inductive power transfer system comprising a resonant inductive power transmitter and a resonant inductive power receiver, wherein the resonant inductive power transmitter comprises:

a voltage source;

a first inductor and a first capacitor which are connected to form a first resonant circuit that is supplied with a voltage by the voltage source;

a first switch and a second inductor which are connected in parallel with the first inductor when the first switch is closed;

a transmit switch controller configured to control a state of the first switch in accordance with a frequency-change switching sequence, and wherein the resonant inductive power receiver comprises:

a third inductor and a second capacitor which are connected to form a second resonant circuit;

a second switch and a third capacitor which are connected in parallel with the first capacitor when the second switch is closed; and a receive switch controller configured to control a state of the second switch in accordance with the frequency-change switching sequence.

10. The system as recited in claim 9, wherein the third inductor is a receive coil.

11. The system as recited in claim 9, wherein respective resonant frequencies of the first and second resonant circuits equal a first resonant frequency when the first switch is closed and the second switch is open and equal a second resonant frequency when the first switch is open and the second switch is closed, wherein the second resonant frequency is different than the first resonant frequency.

12. The system of claim 9, wherein the receive switch controller commands the second switch to change state when voltage in the third capacitor crosses zero.

13. The system as recited in claim 9, further comprising:

a first transceiver communicatively coupled to the transmit switch controller; and a second transceiver communicatively coupled to the transmit switch controller, and wherein the transmit switch controller is configured to send the frequency-change switching sequence in encrypted form to the first transceiver, and the receive switch controller is configured to receive the frequency-change switching sequence in encrypted form from the second transceiver.

14. The system as recited in claim 9, wherein the first inductor is a transmit coil.

15. The system as recited in claim 14, wherein the second inductor is a coil.

16. A method for transferring power from a resonant inductive power transmitter to a resonant inductive power receiver, the method comprising:

(a) placing the resonant inductive power receiver within an electromagnetic coupling range of the resonant inductive power transmitter (b) using the resonant inductive power transmitter to generate a first oscillating electromagnetic field having a first frequency during a first time interval;

(c) producing a first oscillating electromotive force in the resonant inductive power receiver having the first frequency during the first time interval by resonant electromagnetic induction;

(d) using the resonant inductive power transmitter to generate a second oscillating electromagnetic field having a second frequency different than the first frequency during a second time interval subsequent to the first time interval; and (e) producing a second oscillating electromotive force in the resonant inductive power receiver having the second frequency during the second time interval by resonant electromagnetic induction.

17. The method as recited in claim 16, further comprising:

(f) configuring the resonant inductive power transmitter to generate the first oscillating electromagnetic field by opening a first switch in the resonant inductive power transmitter prior to step (b);

(g) configuring the resonant inductive power receiver to produce the first oscillating electromotive force by closing a second switch in the resonant inductive power receiver prior to step (c);

(h) configuring the resonant inductive power transmitter to generate the second oscillating electromagnetic field by closing the first switch prior to step (d); and (i) configuring the resonant inductive power receiver to produce the second oscillating electromotive force by opening the second switch prior to step (e).

18. The method as recited in claim 17, wherein states of the first and second switches and the first and second time intervals are dictated by a frequency-change switching sequence, the method further comprising sending information in encrypted form from the resonant inductive power transmitter to the resonant inductive power receiver, which information includes the frequency-change switching sequence.

19. The method as recited in claim 18, further comprising detecting presence of the first oscillating electromagnetic field within an electromagnetic coupling range of the resonant inductive power receiver, wherein the resonant inductive power receiver begins switching the second switch in accordance with the frequency-change switching sequence in response to detection of the presence of the first oscillating electromagnetic field within the electromagnetic coupling range.

20. The method as recited in claim 18, wherein steps (f) through (h) are repeated in accordance with the frequency-change switching sequence.

* * * * *